US008867248B2

(12) United States Patent
Wang

(10) Patent No.: US 8,867,248 B2
(45) Date of Patent: Oct. 21, 2014

(54) HIGH-EFFICIENCY, THREE-LEVEL, SINGLE-PHASE INVERTER

(75) Inventor: Zitao (Peter) Wang, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 329 days.

(21) Appl. No.: 13/331,539

(22) Filed: Dec. 20, 2011

(65) Prior Publication Data

US 2013/0155747 A1  Jun. 20, 2013

(51) Int. Cl.
H02M 7/42 (2006.01)

(52) U.S. Cl.
USPC ......................................... 363/132

(58) Field of Classification Search
USPC ................................ 363/131–140
See application file for complete search history.

(56) References Cited

U.S. PATENT DOCUMENTS

| | | | |
|---|---|---|---|
| 5,953,222 A | 9/1999 | Mizutani | |
| 7,126,409 B2 | 10/2006 | Nielsen | |
| 7,378,820 B2 | 5/2008 | Liu et al. | |
| 7,411,802 B2 | 8/2008 | Victor et al. | |
| 7,456,519 B2 | 11/2008 | Takeda et al. | |
| 7,729,139 B2 * | 6/2010 | Chan et al. | 363/40 |
| 7,843,714 B2 | 11/2010 | Bremicker et al. | |
| 8,493,761 B2 * | 7/2013 | Tan et al. | 363/132 |
| 8,508,965 B2 * | 8/2013 | Hallak | 363/132 |
| 2011/0013438 A1 | 1/2011 | Frisch et al. | |
| 2011/0096581 A1 | 4/2011 | Hallak | |
| 2011/0255316 A1 | 10/2011 | Burger et al. | |

FOREIGN PATENT DOCUMENTS

| | | |
|---|---|---|
| DE | 102005047373 | 4/2007 |
| DE | 102006010694 | 9/2007 |
| EP | 1369985 | 12/2003 |
| EP | 2051364 | 4/2009 |
| JP | 6292361 | 10/1994 |
| WO | 2009098093 | 8/2009 |
| WO | 2010044164 | 4/2010 |

OTHER PUBLICATIONS

H. Wakimoto et al., "600V Reverse Blocking IGBTs with Low On-state Voltage" available as early as May 17-19, 2011 (Abstract—1 page).

Akira Nabae et al., "A New Neutral-Point-Clamped PWM Inverter" IEEE Transactions on Industry Applications, vol. IA-17, No. 5, dated Sep./ Oct. 1981 (6 pages).

(Continued)

Primary Examiner — Jessica Han
(74) Attorney, Agent, or Firm — Michael Best & Friedrich LLP

(57) ABSTRACT

A highly efficient transformerless inverter and a method of controlling the same. The inverter is designed for use in a distributed power generation system, such as a home having photovoltaic cells (e.g., a solar panel), wind turbines, batteries, and other sources of DC electrical power. The inverter includes four switching states including a positive current path for a positive half-cycle, a free-wheel current path for the positive half-cycle, a negative current path for a negative half-cycle, and a second free-wheel current path for the negative half-cycle. The free-wheel current paths include a reduced number of circuit components (e.g., diodes), which enables a highly efficient inversion of DC power to AC power.

20 Claims, 7 Drawing Sheets

(56) References Cited

OTHER PUBLICATIONS

J. Song-Manguelle et al., "Multilevel Inverter for Power System Applications : Highlighting Asymmetric Design Effects From a Supply Network Point of View" Laboratoire d'Electronique Industrielle, Ecole Polytechnique Fédérale de Lausanne, dated May 2003 (6 pages).

Emilio J. Bueno et al., "Design of a Back-to-Back NPC Converter Interface for Wind Turbines With Squirrel-Cage Induction Generator" IEEE Transactions on Energy Conversion, vol. 23, No. 3, dated Sep. 2008 (14 pages).

Infineon Technologies AG, "Cool MOS™ Power Transistor" available as early as Mar. 16, 2004 (12 pages).

Leopoldo G. Franquelo, "Multilevel Inverters. Topologies, Modulation Techniques and Practical Problems" Electronic Engineering Department. University of Seville, available as early as Apr. 27, 2010 (4 pages).

"Appendix: Grid Connected Inverters—Control Types & Harmonic Performance" Study of Grid-connected PV Systems' Benefits, Opportunities, Barriers and Strategies, available as early as Nov. 16, 2011 (6 pages).

Remus Teodorescu et al., "Grid Converters for PV and WT Systems" ECCE'09 Tutorial, available as early as 2009 (52 pages).

Wikipedia.org, "Inverter (electrical)" https://en.wikipedia.org/wiki/Inverter_(electrical), available as early as Mar. 30, 2010 (8 pages).

Surin Khomfoi et al., "Chapter 31 Multilevel Power Converters" available as early Apr. 27, 2010 (50 pages).

Alian Chen et al., "Single-Phase Hybrid Clamped Three-Level Inverter Based Photovoltaic Generation System" 2nd IEEE International Symposium on Power Electronics for Distributed Generation Systems, dated 2010 (4 pages).

Li Peng-fei et al., "A Novel Boost Three-level Inverter" Journal of Shanghai Jiaotong University, dated Aug. 2009 (5 pages).

Ma Lin et al., "Comparison of the Topologies of High Efficiency Neutral Point Clamping Photovoltaic Inverters" Transactions of China Electrotechnical Society, dated Feb. 2011 (7 pages).

Kambiz Arab Tehrani et al., "Power loss calculation in two different multilevel inverter models" Electric Power Systems Research, available as early as Nov. 2, 2010 (11 pages).

S. De et al., "Multilevel inverters for low-power application" Published in IET Power Electronics, available as early as Jun. 21, 2010 (9 pages).

P. K. Steimer et al., "A reliable, interface-friendly Medium Voltage Drive based on the robust IGCT and DTC technologies" IEEE Industry Applications Society Annual Meeting, dated Oct. 1999 (8 pages).

Ahmet M. Hava et al., "On the Contribution of PWM Methods to the Common Mode (Leakage) Current in Conventional Three-phase Two-level Inverters as Applied to AC Motor Drives" Department of Electrical and Electronics Engineering Middle East Technical University, dated 2008 (8 pages).

Samuel Vasconcelos Araújo et al., "Highly Efficient Single-Phase Transformerless Inverters for Grid-Connected Photovoltaic Systems" IEEE Transactions on Industrial Electronics, vol. 57, No. 9, dated Sep. 2010 (11 pages).

Roberto González et al., "Transformerless Inverter for Single-Phase Photovoltaic Systems" IEEE Transactions on Power Electronics, vol. 22, No. 2, dated Mar. 2007 (5 pages).

Juan Dixon et al., "Multilevel Inverter, Based on Multi-Stage Connection of Three-Level Converters, Scaled in Power of Three" available as early as Apr. 27, 2010 (8 pages).

\* cited by examiner

Positive Current Switching State

Free-Wheeling Current Switching State
(Positive Half-Cycle)

Negative Current Switching State

Free-Wheeling Current Switching State
(Negative Half-Cycle)

Positive Current Switching State

Free-Wheeling Current Switching State
(Positive Half-Cycle)

Negative Current Switching State

Free-Wheeling Current Switching State
(Negative Half-Cycle)

US 8,867,248 B2

HIGH-EFFICIENCY, THREE-LEVEL, SINGLE-PHASE INVERTER

BACKGROUND

The present invention relates to electrical inverters. More particularly, the invention relates to a three-level, single-phase inverter. The inverter has applicability to grid-connected systems.

Inverters are devices that convert direct current (DC) to alternating current (AC). One type of inverter may be constructed by connecting a DC source to a transformer through the center tap of the primary winding of the transformer. A switch connected to the DC source is rapidly switched between two nodes (each of which is connected to opposite sides of the primary winding) to allow current to flow back to the DC source through two alternate paths: through one end of the primary winding and then the other. The alternation of the direction of current in the primary winding of the transformer produces alternating current (or AC) in the secondary winding. Inverters of this design or other designs may receive DC power from, for instance, solar panels, generators, wind turbines, batteries, and other sources, convert the DC power to AC power, and export the AC power to local loads or a power grid.

Such inverters, and other inverters including a transformer, provide galvanic isolation between the DC input and the AC output. However, these transformers have severe drawbacks, like high weight, high cost, low efficiency, and a non-unity power factor, especially under low load conditions. High frequency inverters with transformers may reduce weight and have unity power factor, but do not improve the efficiency of the power inversion.

Transformerless inverters convert DC power to AC power without the use of a transformer along the DC-to-AC conversion path. Rather than a transformer, transformerless inverters include power switching elements, such as MOSFET and/or IGBT transistors, that are particularly arranged and controlled to convert received DC power to AC power and to reduce the influence between DC input and AC output. Regardless of the design, energy is lost in an inverter during the conversion of DC power to AC power. The less energy lost in the conversion, the more efficient the inverter. Transformerless inverters, although often more complex, are generally more efficient than inverters with transformers.

SUMMARY

While generally more efficient than transformer-based inverters, the inventor(s) has (have) learned that the efficiency of transformerless inverters is not as high as desired for certain applications. Embodiments of the invention include a transformerless inverter with improved efficiency. In a particular instance, the invention provides a grid-connectable inverter that has a first DC input node and a second DC input node; a first AC output node and a second AC output node. The inverter also includes a first switch, a second switch, a third switch, a fourth switch, a first diode, and a second diode. The inverter further includes four paths: a positive current path for a positive half-cycle, a first free-wheel current path for the positive half-cycle, a negative current path for a negative half-cycle and a second free-wheel current path for the negative half-cycle. The first free-wheel current path includes the first AC output node, the first switch, the first diode, the fourth switch, and the second AC output node. In the first free-wheel current path, no additional diode is connected in series with the first diode between the first switch and fourth switch. The second free-wheel current path includes the second AC output node, the second switch, the second diode, the third switch, and the first AC output node. In the second free-wheel current path, no additional diode is connected in series with the second diode between the second switch and third switch.

Embodiments of the invention also provide a method of inverting DC power to AC power with a grid-connectable inverter. The inverter includes first and second DC input nodes, first and second AC output nodes, four switches (a first, second, third, and fourth), a first diode, and a second diode. The method includes receiving DC input at the first and second DC input node. At least the first, second, third, and fourth switches are controlled to create a positive current path for a positive half-cycle. Also during the positive half-cycle, the first switch and the fourth switch are closed to create a first free-wheel current path. The first free-wheel current path includes the first AC output node, the first switch, the first diode, the fourth switch, and the second AC output node. In the first free-wheel current path, no additional diode is connected in series with the first diode between the first and fourth switch. The method further includes controlling at least the first, second, third, and fourth switches to create a negative current path for a negative half-cycle. During the negative half-cycle, the second switch and the third switch are closed to create a second free-wheel current path for the negative half-cycle. The second free-wheel current path includes the second AC output node, the second switch, the second diode, the third switch, and the first AC output node. In the second free-wheel current path, no additional diode is connected in series with the second diode between the second and third switch.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
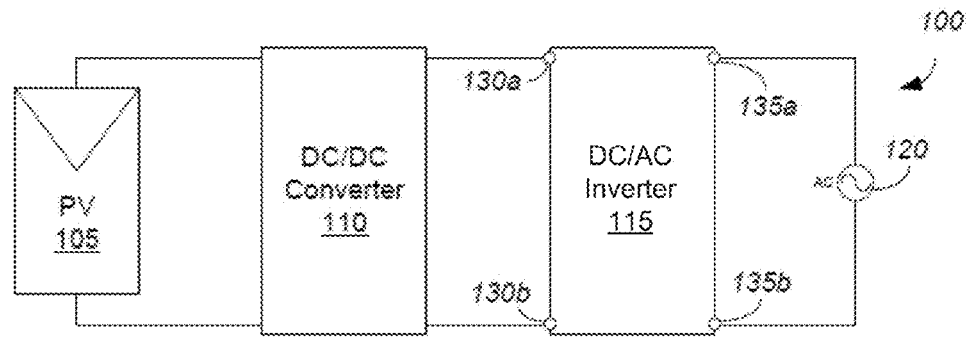
FIG. 1 depicts a power conversion system.

FIG. 1 illustrates a power conversion system 100. The power conversion system 100 includes a photovoltaic (PV) panel 105, a DC/DC converter 110, an inverter 115, and an AC grid 120. The PV panel 105 receives solar radiation and converts the radiation to DC power. The PV panel outputs the DC power to the DC/DC converter 110. The DC/DC converter 110 bucks or boosts the DC power to a level appropriate for the inverter 115. For instance, the DC/DC converter 110 provides a DC output with predetermined characteristics such as a particular voltage within a defined tolerance. The DC/DC converter 110 can be considered as providing "conditioned power" and it may be a transformerless converter or it may contain a transformer. The inverter 115 receives the conditioned DC power from the DC/DC converter 110 and inverts the DC power to AC power. The inverter 115 then outputs the AC power to the AC grid 120.

A power grid (sometimes simply referred to as a "grid" herein), such as grid 120, is a system of transmission lines and other devices by which electrical power generated by an electric utility company is transmitted to customers. Stated another way, the grid 120 is an electrical network that interconnects one or more AC power suppliers with one or more AC power consumers. Taking, for example, an individual home or facility including the inverter 115, the grid 120 may connect the inverter 115 with an external electrical utility grid, with local power-consuming devices (e.g., loads connected to outlets in or nearby the home), or both. In normal operation, the grid 120 provides AC power with a sinusoidal voltage waveform with an approximately constant magnitude and frequency (e.g., 120 V at 60 Hz when delivered to a local sub-section of the grid powering homes). In other parts or at other delivery points, the power provided by grid 120 may have various magnitudes (e.g., 208 V, 240 V, 277 V, to many kV) and frequencies (e.g., 50 Hz or 60 Hz) depending on the implementation or local standards. The inverter 115 has applicability to systems that are "grid connected" or tied to the grid 120. Although, it is possible to connect the inverter 115 (with additional equipment not shown) to a local electrical system or local loads ("off grid") instead of the grid 120.

Figure 2:
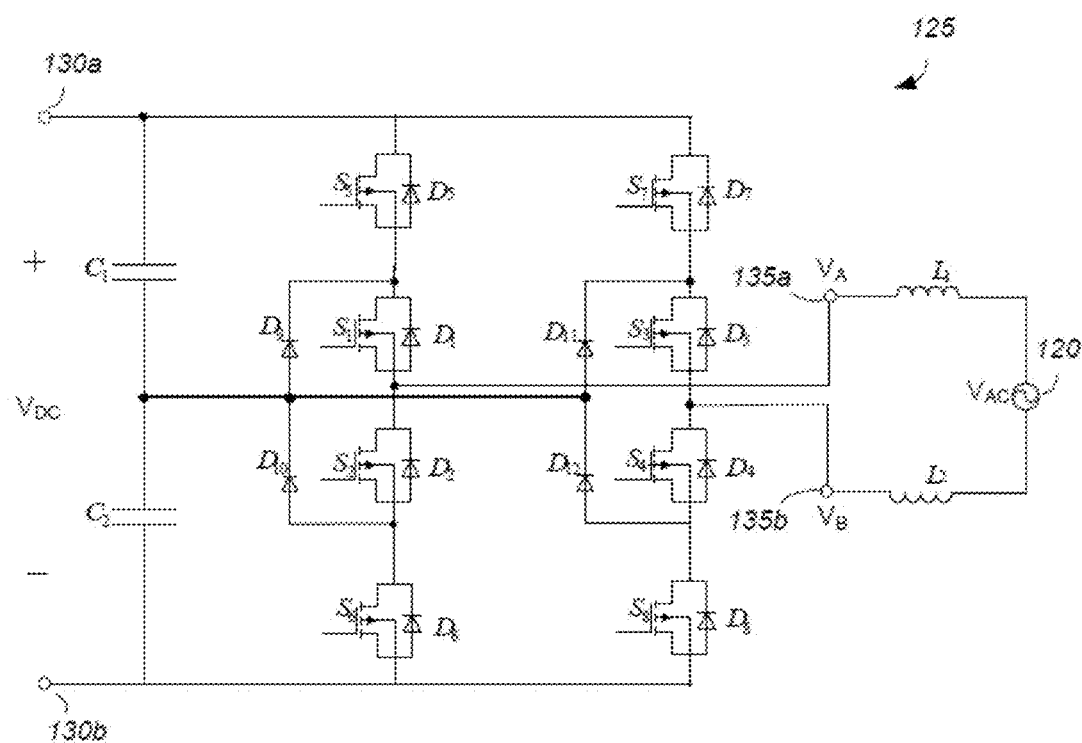
FIG. 2 depicts a prior-art, three-level transformerless inverter.

FIG. 2 illustrates a prior-art, three-level transformerless inverter 125 having a neutral point clamped (NPC) topology. The inverter 125 is an exemplary inverter 115 of FIG. 1. Although the NPC topology of FIG. 2 has more switching elements than a traditional H-bridge circuit, the NPC topology has a reduced voltage rating value and reduces the influence of common mode voltage. Common mode voltage in inverter systems can produce leakage currents, which are potentially harmful. For instance, if leakage currents are present, voltage can build on stray capacitances of a PV panel. If an individual contacts the PV panel and is connected to ground, the leakage current can discharge through the individual.

The inverter 125 includes eight switching elements ($S_1$-$S_8$), eight diodes ($D_1$-$D_8$) associated with the switching elements, four additional diodes ($D_9$-$D_{12}$), two capacitors ($C_1$, $C_2$), and two filter inductors ($L_1$, $L_2$). The switching elements $S_1$-$S_8$ are MOSFET transistors, and the diodes $D_1$-$D_8$ are reverse body diodes for the switching elements $S_1$-$S_8$. The inverter 125 receives a $V_{DC}$ input across nodes 130a and 130b. For instance, the inverter 125 may be coupled to a PV panel and DC/DC converter as shown in FIG. 1. The $V_{DC}$ input is inverted and output to the AC grid 120 via nodes 140a and 140b. In one example, the switch frequency of switches $S_1$-$S_4$ is generally 60 Hz (a low frequency), and the switch frequency of switches $S_5$~$S_8$ is generally 50 kHz (a high frequency).

Throughout this description, the terms "on" and "off" are used in describing components of circuit diagrams. When used with a switching element, the term "on" indicates (in the case of a MOSFET) that a voltage is applied to the control terminal of the switching element (e.g., the gate) such that current can flow through the other terminals (e.g., the source and drain). The term "off" indicates that no or a low voltage is applied to the gate of the switching element and there is no (or negligible) current flow between the drain and source. In figures of the present application, transistors that are "on" are shown as conducting wires, while transistors that are "off" are shown as an open switch. The term "on" when used with a diode indicates that the diode is conducting electricity in a forward-bias direction. The term "off" when used with a diode indicates that the diode is not conducting electricity (in any direction). While the transistors and diodes have more complicated electrical characteristics and responses, these depictions provide a simplified explanation of the inverter circuits described herein.

Figure 3A:
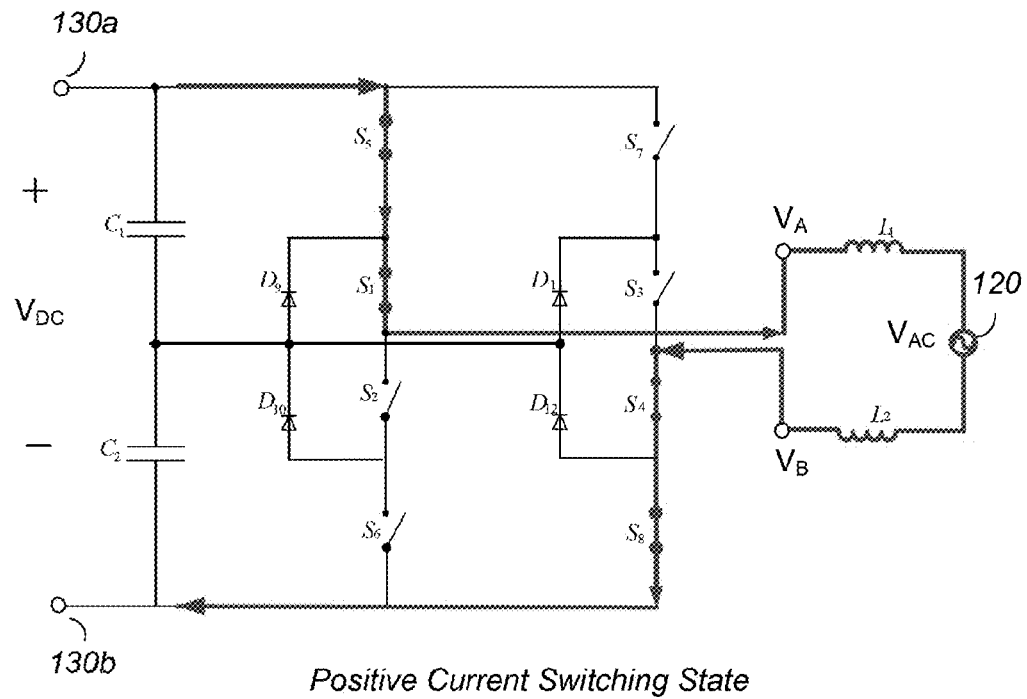
FIGS. 3A-D depict the four switching states, respectively, of the prior-art, three-level transformerless inverter.
Figure 3B:
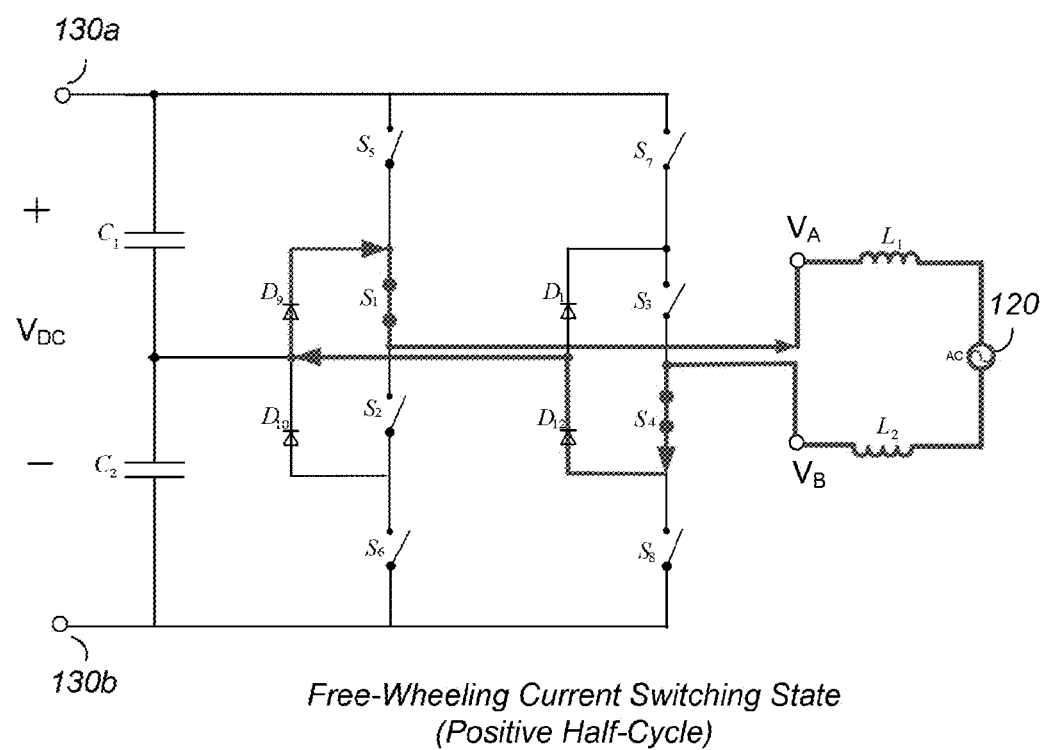
Figure 3C:
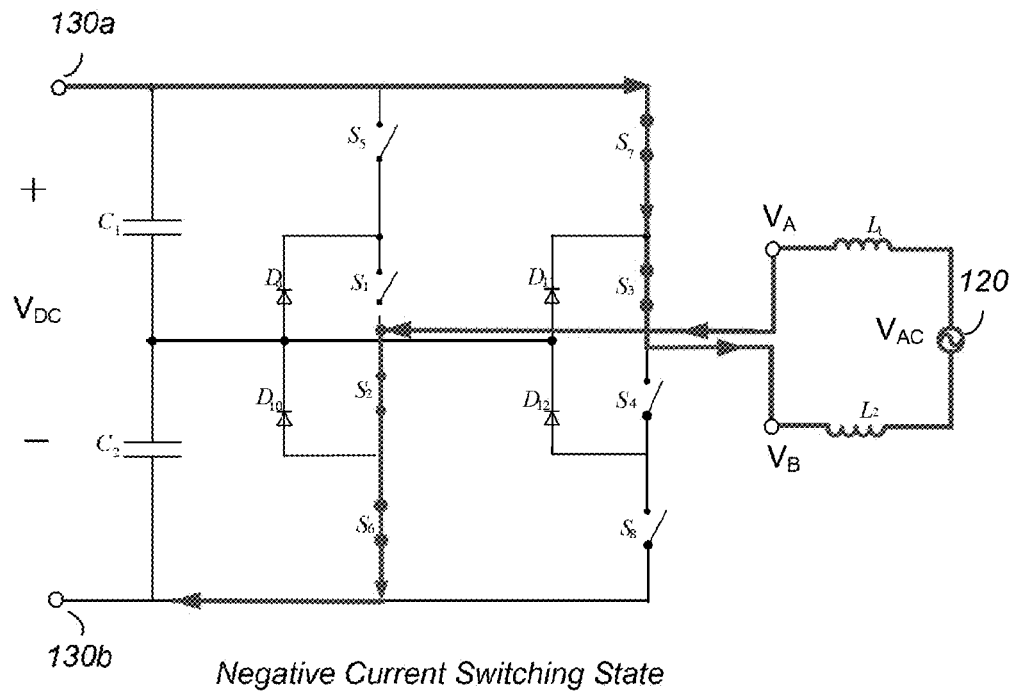
Figure 3D:
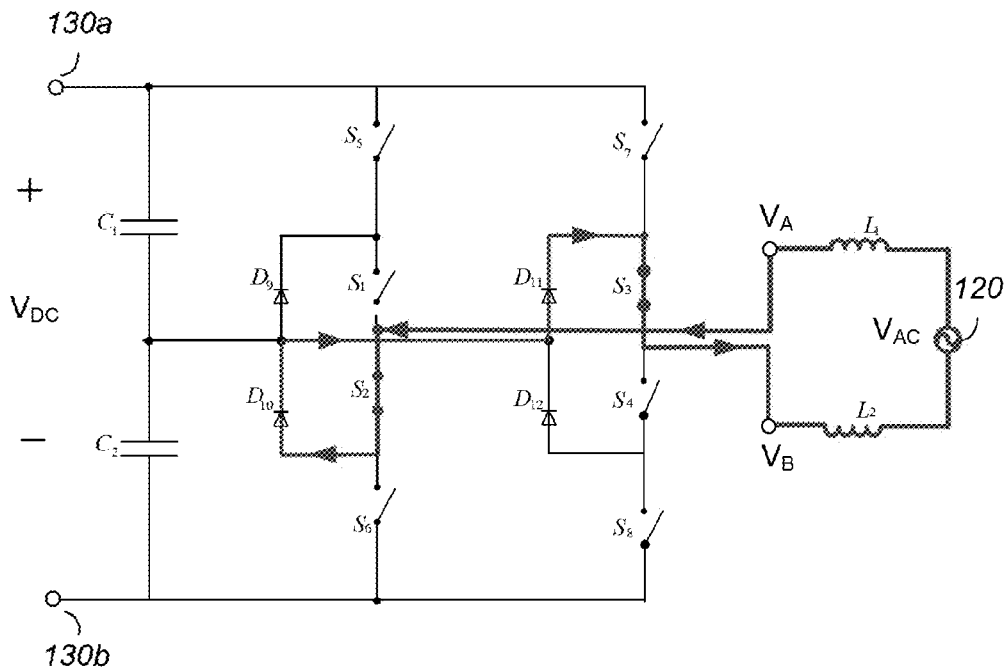

FIGS. 3A-D illustrate current flow during four switching states of the inverter 125:

a positive current switching state for a positive half-cycle (FIG. 3A);

a free-wheel current state for the positive half-cycle (FIG. 3B);

a negative current switching state for a negative half-cycle (FIG. 3C); and a free-wheel current state for the negative half-cycle (FIG. 3D).

In the positive switching states of FIGS. 3A-B, switches $S_5$ and $S_8$ are controlled by a PWM signal to turn "on" and turn "off" synchronously at a high frequency (e.g., 50 kHz), while switches $S_1$ and $S_4$ remain consistently "on." In FIG. 3A, switches $S_5$ and $S_8$ are "on," along with switches $S_1$ and $S_4$. The current path in FIG. 3A is as follows: node 130a→$S_5$→$S_1$→$L_1$→grid 120→$L_2$→$S_4$→$S_8$→node 130b. With switches $S_5$ and $S_8$ "off," as shown in FIG. 3B, the current (called free-wheel current) flows through $S_1$→$L_1$→grid 120→$L_2$→$S_5$→$S_4$→$D_{12}$→$D_9$.

In the negative switching states of FIGS. 3C-D, switches $S_6$ and $S_7$ are controlled by a PWM signal to turn "on" and turn "off" synchronously at a high frequency (e.g., 50 kHz), while switches $S_2$ and $S_3$ remain consistently in an "on" state. In FIG. 3C, switches $S_6$ and $S_7$ are "on," as well as switches $S_2$ and $S_3$. The current path in FIG. 3C is as follows: node 130a→$S_7$→$S_3$→$L_2$→grid 120→$L_1$→$S_2$→$S_6$→node 130b. With switches $S_6$ and $S_7$ off as shown in FIG. 3D, the current (called free-wheel current) flows through $S_2$→$D_{10}$→$D_{11}$→$S_3$→$L_2$→grid 120→$L_1$.

In the four states of the inverter 125, the common mode voltage is held constant. More specifically, in positive current switching state (FIG. 3A), the common mode voltage is:

$$V_{common mode} = \frac{1}{2}(V_A + V_B) = \frac{1}{2}(V_{input} + 0) = 0.5 V_{input}. \quad (1)$$

During free-wheel periods, the diodes $D_9$-$D_{12}$ allow current to flow and clamp voltage to the middle point of input voltage to reduce common mode voltage influence. In the positive free-wheel current switching state (FIG. 3B), the common mode voltage is:

$$V_{common mode} = \frac{1}{2}(V_A + V_B) = \frac{1}{2}\left(\frac{1}{2}V_{input} + \frac{1}{2}V_{input}\right) = 0.5 V_{input}. \quad (2)$$

A similar analysis applies to the negative switching states of FIGS. 3C-D. Accordingly, the common mode voltage of the inverter 125 is held at half of the input voltage ($V_{DC}$) through the four switching states, and the leakage current of the inverter 125 is controlled.

In free-wheel current states of a three-level transformerless inverter, such as shown in FIGS. 3B and 3D for inverter 125, the inverter efficiency is decreased with each additional circuit component (i.e., switch or diode) within the current path. In the free-wheel current state shown in FIG. 3B, the current flows through two diodes ($D_{12}$, $D_9$) and two switches ($S_1$, $S_4$). Similarly, in the free-wheel current state shown in FIG. 3D, the current flows through two diodes ($D_{10}$, $D_{11}$) and two switches ($S_2$, $S_3$). As explained in greater detail below, embodiments of the invention include an inverter having a free-wheel current state with current flowing through two switches and one diode; one less diode than the inverter 125. Accordingly, embodiments of the invention include an inverter with an improved efficiency.

Figure 4:
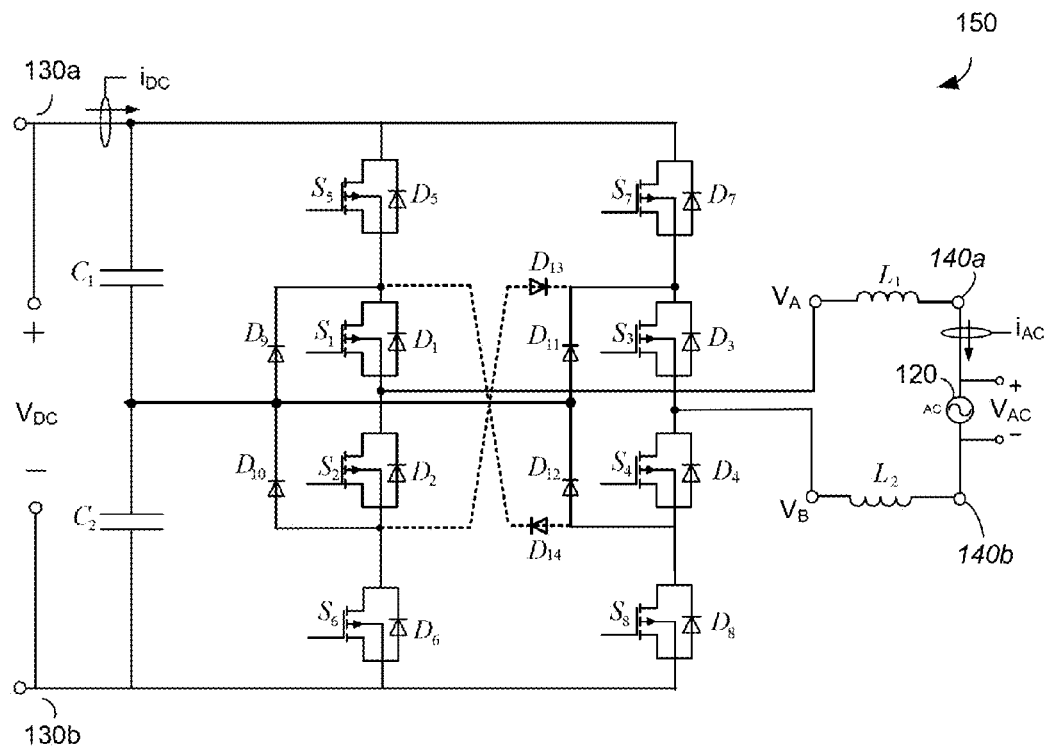
FIG. 4 depicts a three-level transformerless inverter according to embodiments of the invention.
Figure 4:
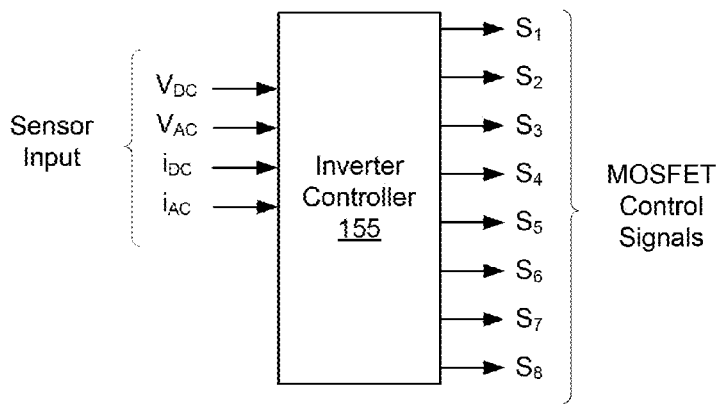

FIG. 4 depicts an inverter 150 with improved efficiency according to embodiments of the invention. The inverter 150 inverts DC power received via nodes 130a and 130b and outputs AC power to the grid 120 via nodes 140a and 140b. Like the inverter 125, the inverter 150 is transformerless and has an NPC topology to prevent leakage current. Also like the inverter 125, the inverter 150 may serve as inverter 115 in system 100 of FIG. 1, and the inverter 150 includes eight MOSFET switching elements ($S_1$-$S_8$), eight diodes ($D_1$-$D_8$) associated with the switching elements, four additional diodes ($D_9$-$D_{12}$) to control common mode voltage, two capacitors ($C_1$, $C_2$), and two filter inductors ($L_1$, $L_2$). Additionally, as will be explained in greater detail below, the inverter 150 includes two diodes $D_{13}$ and $D_{14}$ to provide high-efficiency, free-wheel current paths. The switching elements $S_1$, $S_2$, $S_5$, and $S_6$ are part of a first three-level neutral point clamped bridge, and the switching elements $S_3$, $S_4$, $S_7$, and $S_8$ are part of a second three-level neutral point clamped bridge.

The inverter 150 is monitored and controlled by a controller 155. The controller 155 receives signals from sensors to monitor the inverter 150 including, for instance, current and voltage sensors for measuring $V_{DC}$, $i_{DC}$, $V_{AC}$, and $i_{AC}$. For instance, the inverter controller 155 may monitor the voltage and current at nodes 130a and 130b, and the grid 120. Based on the monitoring, the controller 155 selectively controls the switching elements $S_1$-$S_8$ to invert the DC power received via nodes 130a and 130b and to provide AC power to the grid 120 synchronously via nodes 140a and 140b. The control signals to the switching elements $S_1$-$S_8$ may include pulse-width modulated (PWM) signals. The controller 155 is one of a microcontroller, a microprocessor with appropriate memory and I/O devices, a field programmable gate array (FPGA), an application specific integrated circuit (ASIC), a digital signal processor (DSP), or the like.

Figure 5A:
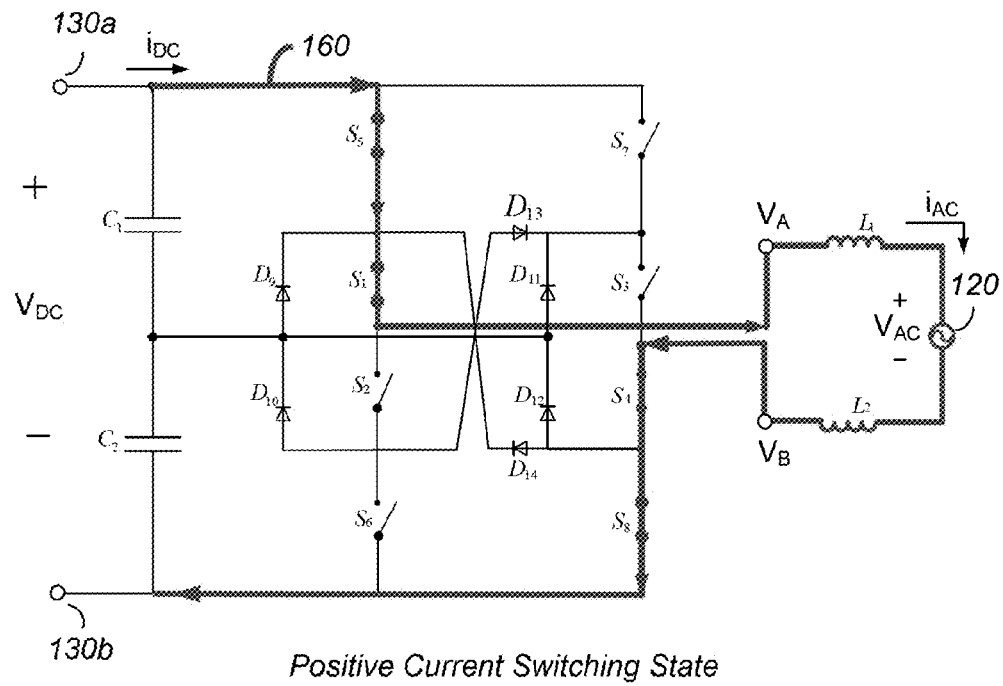
FIGS. 5A-D depict the four switching states, respectively, of a three-level transformerless inverter according to embodiments of the invention.
Figure 5B:
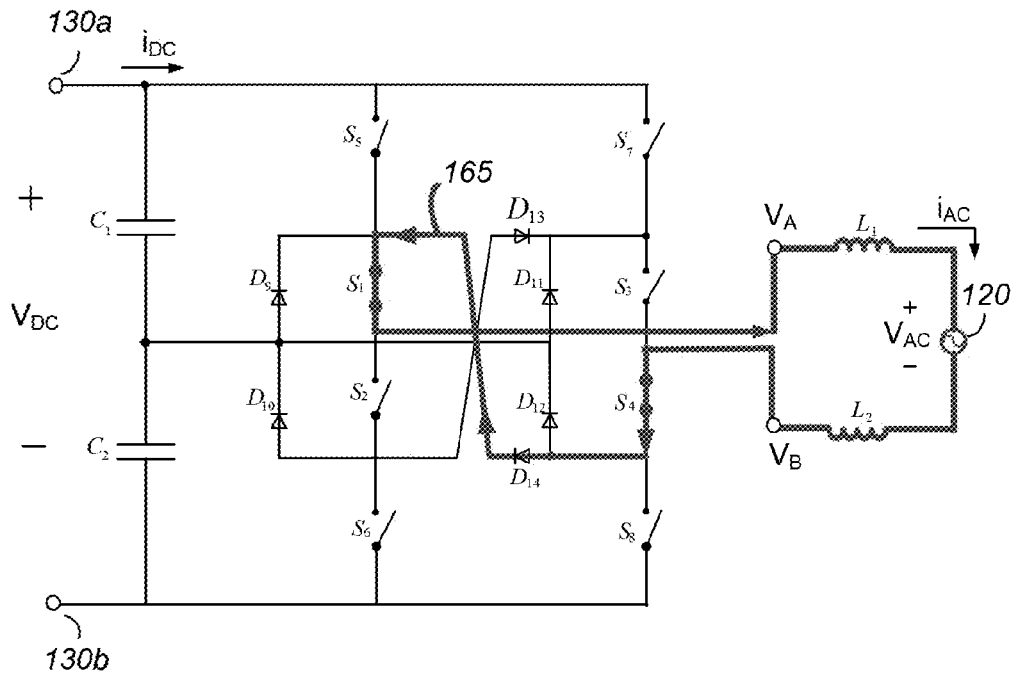
Figure 5C:
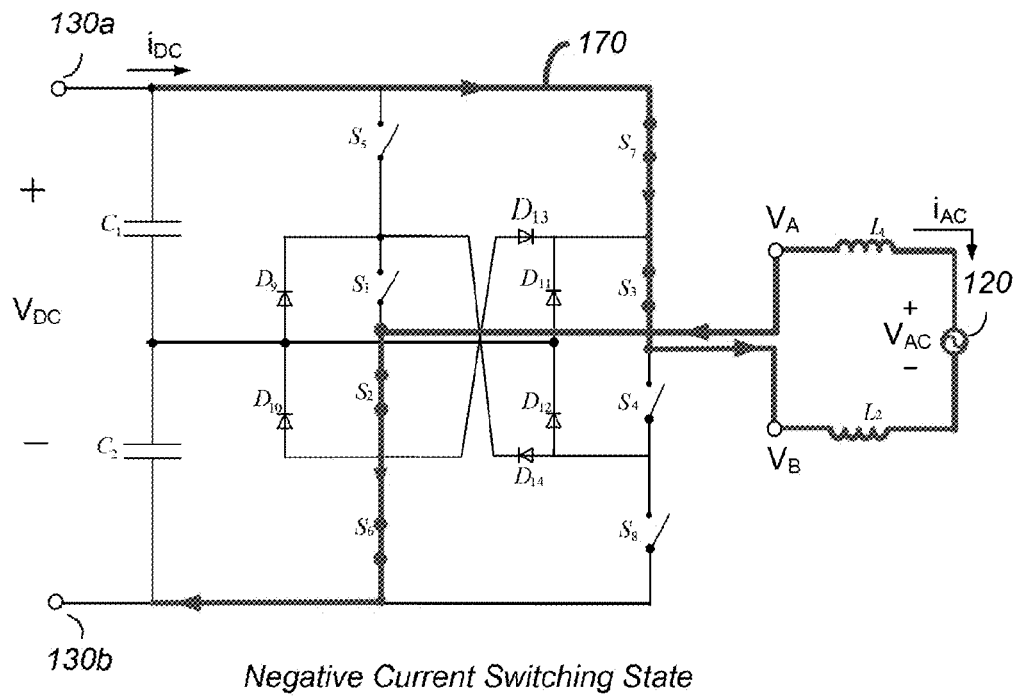
Figure 5D:
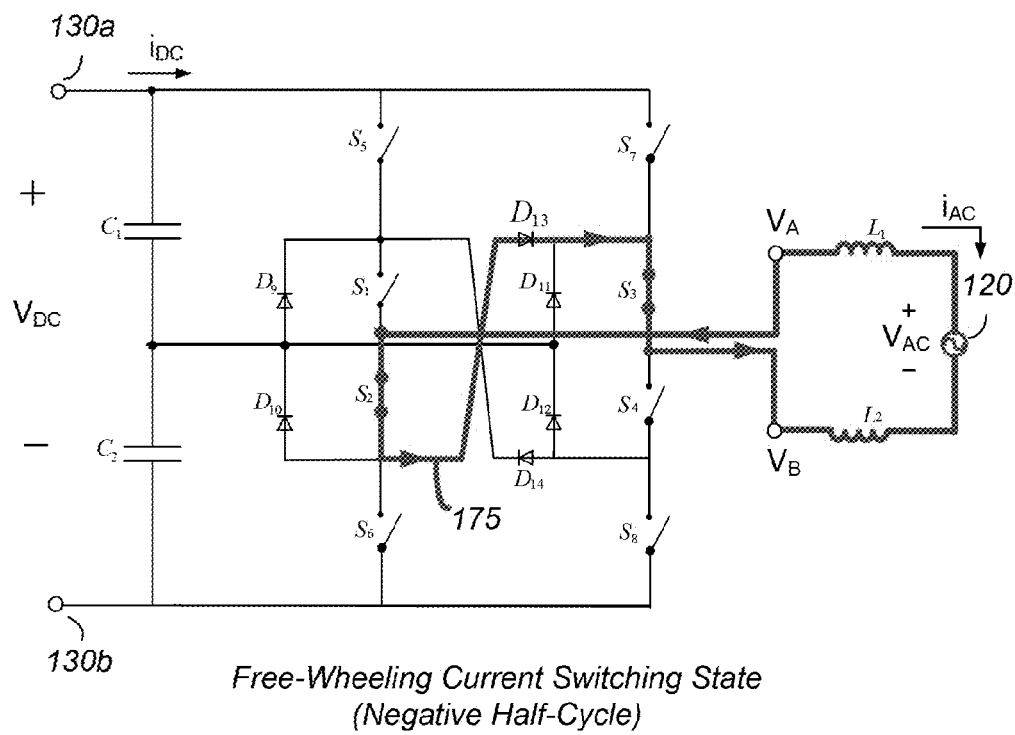

FIGS. 5A-D illustrate current flow during four switching states of the inverter 150: a positive current switching state for a positive half-cycle (FIG. 5A); a free-wheel current state for the positive half-cycle (FIG. 5B); a negative current switching state for a negative half-cycle (FIG. 5C); and a free-wheel current state for the negative half-cycle (FIG. 5D). In the positive switching states of FIGS. 5A-B, switches $S_5$ and $S_8$ are controlled by a PWM signal to turn "on" and turn "off" synchronously at a high frequency (e.g., 50 kHz), while switches $S_1$ and $S_4$ remain consistently "on." In FIG. 5A, switches $S_5$ and $S_8$ are "on," along with switches $S_1$ and $S_4$. The current path in FIG. 5A (positive current path 160) is as follows: node 130a→$S_5$→$S_1$→$L_1$→grid 120→$L_2$→$S_4$→$S_8$→node 130b.

When the switches $S_5$ and $S_8$ are off, as shown in FIG. 5B, the free-wheel current flows through a free-wheel current path 165, which includes $S_1$→$L_1$→grid 120→$L_2$→$S_4$→$D_{14}$. During the free-wheel current state for the positive half-cycle of the inverter 150, current flows through only one diode ($D_{14}$), rather than two diodes ($D_9$ and $D_{12}$) as shown in FIG. 3B for the inverter 125. Accordingly, the efficiency of the inverter 150 is improved during the free-wheel current stage for the positive half-cycle as compared with the inverter 125.

As with the inverter 125, when switches $S_5$ and $S_8$ are "on," the common mode voltage is:

$$V_{common\,mode} = \frac{1}{2}(V_A + V_B) = \frac{1}{2}(V_{input} + 0) = 0.5V_{input}$$

Additionally, with switches $S_5$ and $S_8$ off, the common mode voltage is:

$$V_{common\,mode} = \frac{1}{2}(V_A + V_B) = \frac{1}{2}\left(\frac{1}{2}V_{input} + \frac{1}{2}V_{input}\right) = 0.5V_{input}. \quad (2)$$

Based on the above circuit analysis, the common mode voltage of the inverter 150 is shown to be constant. Accordingly, the leakage current of the inverter 125 is controlled. During free-wheel periods, the diodes $D_9$-$D_{12}$ allow current to flow and clamp stray voltage to the middle point of the input voltage (i.e., the node connecting $C_1$ and $C_2$) to reduce common-mode voltage influence.

FIG. 5C illustrates the negative current switching state and FIG. 5D illustrates the negative free-wheel current state for the inverter 150. In the negative switching states of FIGS. 3C-D, switches $S_6$ and $S_7$ are controlled by a PWM signal of the controller 155 to turn on and turn off synchronously at a high frequency (e.g., 50 kHz), while switches $S_2$ and $S_3$ remain consistently in an "on" state. When switches $S_6$ and $S_7$ are "on," as shown in FIG. 5C, the current flows from the input node 130a to the grid 120 and out through node 130b. The current path in FIG. 5C (negative current path 170) is as follows: node 130a→$S_7$→$S_3$→$L_1$→grid 120→$L_2$→$S_2$→$S_6$→node 130b.

With switches $S_6$ and $S_7$ off as shown in FIG. 5D, the free-wheel current flows through a free-wheel current path 175, which includes $S_2$→$D_{13}$→$S_3$→$L_2$→grid 120→$L_1$. During the free-wheel current state for the negative half-cycle of the inverter 150, current flows through only one diode ($D_{13}$), rather than two diodes ($D_{10}$ and $D_{11}$) as shown in FIG. 3D for the inverter 125. Accordingly, the efficiency of the inverter 150 is improved during the free-wheel current stage for the negative half-cycle as compared with the inverter 125.

Similar to the common mode voltage of the inverter 125, the common mode voltage of the inverter 150 is held constant in the four states of the inverter 150. More specifically, in positive current switching state (FIG. 5A), the common mode voltage is:

$$V_{common\,mode} = \frac{1}{2}(V_A + V_B) = \frac{1}{2}(V_{input} + 0) = 0.5V_{input}. \quad (1)$$

During free-wheel periods, the diodes $D_9$-$D_{12}$ allow current to flow and clamp stray voltage to the middle point of the input voltage to reduce common mode voltage influence. In the positive free-wheel current switching state (FIG. 5B), the common mode voltage is:

$$V_{common\,mode} = \frac{1}{2}(V_A + V_B) = \frac{1}{2}\left(\frac{1}{2}V_{input} + \frac{1}{2}V_{input}\right) = 0.5V_{input}. \qquad (2)$$

A similar analysis applies to the negative switching states of FIGS. 5C-D. Accordingly, the common mode voltage of the inverter 150 is held at half of the input voltage ($V_{DC}$) through the four switching states, and the leakage current of the inverter 150 is controlled.

In the inverter 150, the diodes $D_9$-$D_{12}$ are used to control the clamped point voltage. However, free-wheel current passes through the diodes $D_{13}$ and $D_{14}$, not through the diodes $D_9$-$D_{12}$. Current flow resulting from controlling the clamped-point voltage is lower than free-wheel current. The diodes $D_9$-$D_{12}$ in the inverter 125 must be able to handle the free-wheel current and, therefore, must have a higher power rating than diodes $D_9$-$D_{12}$ of the inverter 150. Accordingly, the diodes $D_9$-$D_{12}$ of the inverter 150 may have lower-power ratings than the diodes $D_9$-$D_{12}$ of the inverter 125.

Through experimentation, the inverter 150 with exemplary components and switching control was shown to have an improved efficiency of approximately 0.1% relative to the inverter 125 during normal operation with similar components and switching control. For distributed power applications, such an improvement is substantial. In this experiment, "normal operation" included input voltage levels between approximately 260 V and 600 V, approximate component temperature of 75° C., and a power grid being a 240 V/60 Hz split-grid system. The tested inverters were 3 kW and 4 kW and had a power switching frequency of 50 kHz. Table 1 (below) shows the results of the experiment.

TABLE 1

Efficiency calculation results

|  |  | 3 kW | | 4 kW | |
| --- | --- | --- | --- | --- | --- |
|  | Input Voltage | Inverter 125 | Inverter 150 | Inverter 125 | Inverter 150 |
| Weighted η | 260 V | 96.46% | 96.55% | 96.41% | 96.51% |
|  | 365 V | 97.24% | 97.33% | 97.25% | 97.35% |
|  | 480 V | 97.10% | 97.27% | 97.12% | 97.30% |
| CEC η |  | 96.93% | 97.05% | 96.94% | 97.05% |

As shown in Table 2, efficiency improvements were present for low input voltages (e.g., less than 200 V), but were less substantial.

TABLE 2

Efficiency calculation results at low input voltage

|  |  | 3 kW | | 4 kW | |
| --- | --- | --- | --- | --- | --- |
|  | Input Voltage | Inverter 125 | Inverter 150 | Inverter 125 | Inverter 150 |
| Weighted η | 150 V | 95.51% | 95.60% | 95.26% | 95.36% |
|  | 200 V | 96.11% | 96.20% | 96.00% | 96.10% |

Of course, the above data is from an exemplary experiment with particularly assumed operational parameters (e.g., circuit components, switching control techniques, environment, etc.). The particular efficiency improvements vary depending on the operational parameters of the inverter 150.

Figure 6:
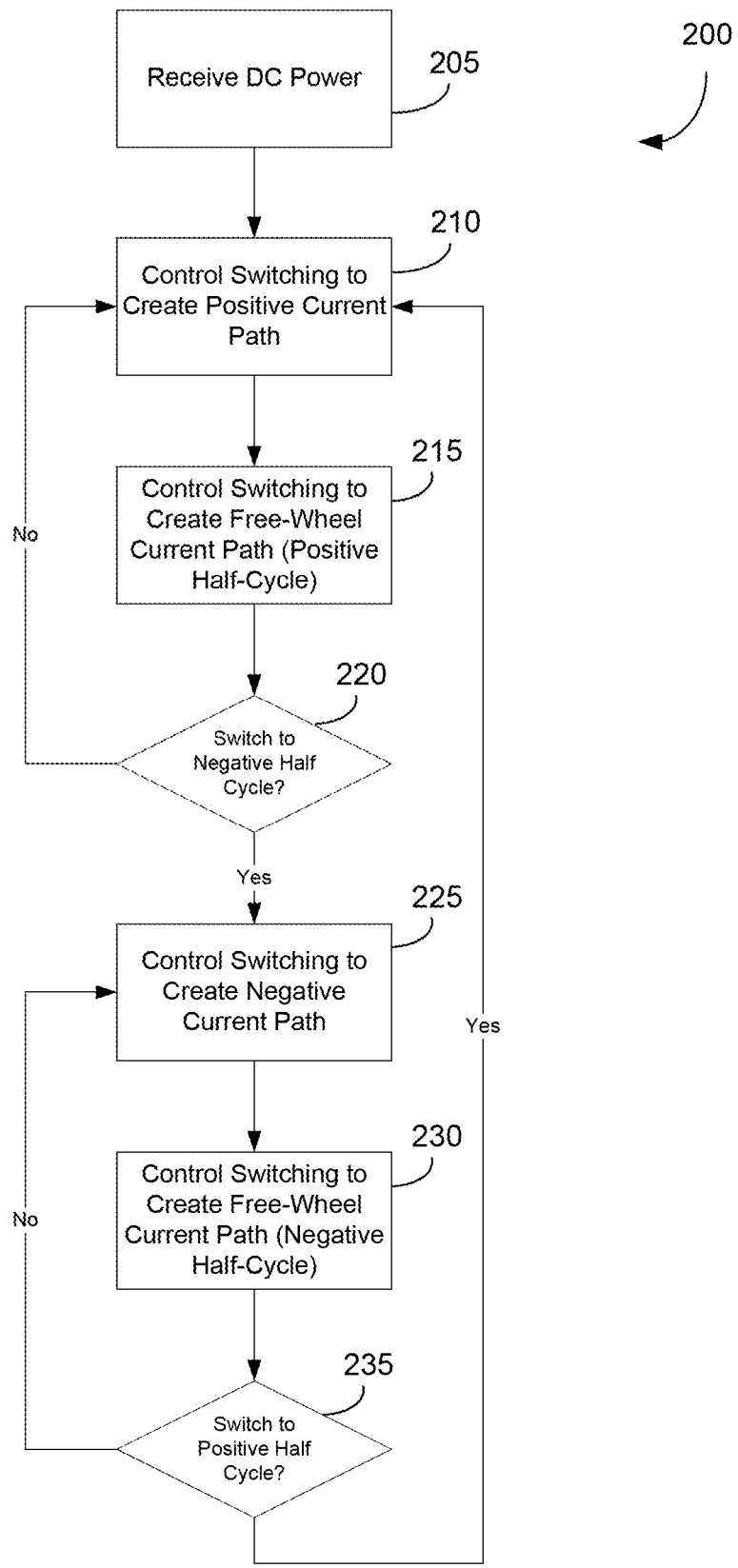
FIG. 6 depicts a method of inverting DC power to AC power according to embodiments of the invention.

FIG. 6 depicts a method 200 of inverting DC power to AC power using the inverter 150. In step 205, the inverter 150 receives DC power via nodes 130a and 130b from the DC/DC converter 110. Although receiving DC power in step 205 is shown as a singular event, step 205 continues throughout the execution of the method 200. In other words, the inverter 150 receives DC power via nodes 130a and 130b throughout steps 210-235.

In step 210, the controller 155 controls the switching elements $S_1$-$S_8$ to create the positive current path 160 shown in FIG. 5A. To create the positive current path 160, switches $S_1$, $S_4$, $S_5$, and $S_8$ are turned "on," and switches $S_2$, $S_3$, $S_6$, and $S_7$ are turned "off." After a certain time period, in step 215, the controller 155 controls the switching elements $S_1$-$S_8$ to create the free-wheeling current path 165 for the positive half-cycle, as shown in FIG. 5B. To create the free-wheeling current path 165, switches $S_5$ and $S_8$ are turned "off" such that switches $S_1$ and $S_4$ remain "on," and switches $S_2$, $S_3$, $S_5$, $S_6$, $S_7$ and $S_8$ are "off."

The AC power output by the inverter 150 is synchronized with the grid 120. The sinusoidal AC power output by the inverter 150 has a frequency (f). Accordingly, each full cycle of the sinusoidal output is 1/f seconds, and each half-cycle is ½×f seconds. During the positive half-cycle, the inverter 150 switches between the positive current path 160 and the free-wheeling current path 165 as necessary to output AC power appropriately to the grid 120. In step 220, the controller 155 determines whether to remain in the positive half-cycle. The controller 155 determines to enter the negative half-cycle based on sensor input data received. Assuming the grid 120 and inverter 150 outputs 60 Hz AC power, the inverter 150 will switch between the positive half-cycle and negative half-cycle approximately every ¹/₁₂₀ of a second.

In step 225, the controller 155 controls the switching elements $S_1$-$S_8$ to create the negative current path 170 shown in FIG. 5C. To create the negative current path 170, switches $S_1$, $S_4$, $S_5$, and $S_8$ are turned "off," and switches $S_2$, $S_3$, $S_6$, and $S_7$ are turned "on." After a certain time period, in step 230, the controller 155 controls the switching elements $S_1$-$S_8$ to create the free-wheeling current path 175 for the negative half-cycle, as shown in FIG. 5D. To create the free-wheeling current path 175, switches $S_6$ and $S_7$ are turned "off" such that switches $S_2$ and $S_3$ remain "on," and switches $S_1$, $S_4$, $S_5$, $S_6$, $S_7$ and $S_8$ are "off."

During the negative half-cycle, the inverter 150 switches between the negative current path 170 and the free-wheeling current path 175 as necessary to output AC power appropriately to the grid 120. In step 235, the controller 155 determines whether to return to the positive half-cycle (step 210) or to return to step 225.

Although the inverter 150 is described as being used with a PV panel 105, other DC sources may be used. For instance, in place of the PV panel 105, one or more of a DC battery, a fossil-fuel powered DC generator, a wind-powered DC generator, bio-fuel powered DC generator, a DC rectified AC power source (e.g., wind-powered AC generator), or another device that outputs DC power may be used. In some embodiments, the PV panel 105 or DC sources are integrated with one more of the DC/DC converter 110 and inverter 125.

Thus, embodiments of the invention provide, among other things, a highly efficient transformerless inverter and a method of controlling the same. Various features and advantages of the invention are set forth in the following claims.

What is claimed is:
1. A grid-connectable inverter comprising:
   a first DC input node and a second DC input node;
   a first AC output node and a second AC output node;
   a first switch, a second switch, a third switch, and a fourth switch;
   a first diode and a second diode;

a positive current path for a positive half-cycle;
a first free-wheel current path for the positive half-cycle, wherein the first free-wheel current path includes the first AC output node, the first switch, the first diode, the fourth switch, and the second AC output node, and wherein no additional diode is connected in series with the first diode between the first and fourth switch;
a negative current path for a negative half-cycle; and
a second free-wheel current path for the negative half-cycle, wherein the second free-wheel current path includes the second AC output node, the second switch, the second diode, the third switch, and the first AC output node, and wherein no additional diode is connected in series with the second diode between the second and third switch.

2. The grid-connectable inverter of claim 1, further comprising a fifth switch and an eighth switch, wherein the positive current path includes the first DC input node, the fifth switch, the first switch, the second AC output node, the first AC output node, the fourth switch, the eighth switch, and the second DC input node.

3. The grid-connectable inverter of claim 1, further comprising a sixth switch and a seventh switch, wherein the negative current path includes the first DC input node, the seventh switch, the third switch, the first AC output node, the second AC output node, the second switch, the third switch, and the second DC input node.

4. The grid-connectable inverter of claim 1, wherein the first AC output node has a first voltage and the second AC output node has a second voltage, and wherein half of the sum of the first voltage and the second voltage remains substantially constant while the inverter is in the positive half-cycle and the negative cycle.

5. The grid-connectable inverter of claim 1, wherein the first AC output node and the second AC output node are coupled to an AC grid.

6. The grid-connectable inverter of claim 1, wherein the first DC input node and the second DC input node are coupled to outputs of a DC to DC converter.

7. The grid-connectable inverter of claim 6, wherein inputs of the DC to DC converter are coupled to a photovoltaic array.

8. The grid-connectable inverter of claim 1, further comprising a controller for selectively controlling the first switch, the second switch, the third switch, and the fourth switch.

9. The grid-connectable inverter of claim 8, wherein the controller selectively controls the first switch, the second switch, the third switch, and the fourth switch based on signals from sensors monitoring at least one of current at the first DC input node, voltage at the first DC input node, current of an AC grid to which the inverter is coupled, and voltage of the AC grid.

10. The grid-connectable inverter of claim 1, wherein the first switch and the second switch form a portion of a first three-level neutral point clamped bridge and the third switch and the fourth switch form a portion of a second three-level neutral point clamped bridge.

11. A method of inverting DC power to AC power with a grid-connectable inverter including first and second DC input nodes, first and second AC output nodes, first, second, third, and fourth switches, and first and second diodes, the method comprising:
receiving DC input at the first and second DC input node;
controlling the first, second, third, and fourth switches to create a positive current path for a positive half-cycle;
closing the first switch and the fourth switch to create a first free-wheel current path for the positive half-cycle, wherein the first free-wheel current path includes the first AC output node, the first switch, the first diode, the fourth switch, and the second AC output node, and wherein no additional diode is connected in series with the first diode between the first and fourth switch;
controlling the first, second, third, and fourth switches to create a negative current path for a negative half-cycle; and
closing the second switch and the third switch to create a second free-wheel current path for the negative half-cycle, wherein the second free-wheel current path includes the second AC output node, the second switch, the second diode, the third switch, and the first AC output node, and wherein no additional diode is connected in series with the second diode between the second and third switch.

12. The method of claim 11, further comprising controlling a fifth switch and an eighth switch to create the positive current path, wherein the positive current path includes the first DC input node, the fifth switch, the first switch, the second AC output node, the first AC output node, the fourth switch, the eighth switch, and the second DC input node.

13. The method of claim 11, further comprising controlling a sixth switch and a seventh switch to create the negative current path, wherein the negative current path includes the first DC input node, the seventh switch, the third switch, the first AC output node, the second AC output node, the second switch, the third switch, and the second DC input node.

14. The method of claim 11, wherein the first AC output node has a first voltage and the second AC output node has a second voltage, and wherein half of the sum of the first voltage and the second voltage remains substantially constant while the inverter is in the positive half-cycle and the negative cycle.

15. The method of claim 11, further comprising coupling the first AC output node and the second AC output node to an AC grid.

16. The method of claim 11, further comprising coupling the first DC input node and the second DC input node to outputs of a DC to DC converter.

17. The method of claim 16, further comprising coupling inputs of the DC to DC converter to a photovoltaic array.

18. The method of claim 11, wherein the DC input is inverted by selectively directing a flow of current through the positive current path, the first free-wheel current path, the negative current path, and the second free-wheel current path.

19. The method of claim 11, wherein the first, second, third, and fourth switches are controlled by a controller based on signals from sensors monitoring at least one of current at the first DC input node, voltage at the first DC input node, current of an AC grid to which the inverter is coupled, and voltage of the AC grid.

20. The method of claim 11, wherein the first and second switches form a portion of a first three-level neutral point clamped bridge and the third and fourth switches form a portion of a second three-level neutral point clamped bridge.

* * * * *